United States Patent
Gill

Patent Number: 5,944,459
Date of Patent: Aug. 31, 1999

[54] APPARATUS AND METHOD FOR SAFELY FORMING AN OPEN-TOPPED POCKET WITH A PERIPHERALLY ENCLOSING RIM EXTENDING THEREAROUND IN THE UPWARDLY FACING SURFACE OF A BAGEL AND FOOD PRODUCT THEREOF

[76] Inventor: William H. Gill, 1353 Rte. 179, Lambertville, N.J. 08530

[21] Appl. No.: 08/933,242

[22] Filed: Sep. 19, 1997

[51] Int. Cl.⁶ ........................................................ B26D 7/01
[52] U.S. Cl. ............................ 408/203.5; 83/451; 83/861; 83/932
[58] Field of Search .................................. 83/19, 176, 451, 83/597, 875, 932, 861; 30/113.1, 310; 408/203.5, 204, 703, 207; 99/542, 544, 547

[56] References Cited

U.S. PATENT DOCUMENTS

| | | | |
|---|---|---|---|
| 685,212 | 10/1901 | Knowlton | 83/597 |
| 1,127,914 | 2/1915 | Nash | 83/597 X |
| 2,975,741 | 3/1961 | Ruffino | 83/597 X |
| 4,343,603 | 8/1982 | Pavlow et al. | |
| 4,674,404 | 6/1987 | D'Erasmo | |
| 4,702,926 | 10/1987 | Fowler | |
| 4,979,419 | 12/1990 | Sonkin | 83/875 |
| 5,033,193 | 7/1991 | Valenti | 30/124 |
| 5,236,724 | 8/1993 | Burger | |
| 5,514,395 | 5/1996 | Burger | |
| 5,557,998 | 9/1996 | Schwartz et al. | 83/875 |
| 5,611,266 | 3/1997 | Kensrue | |
| 5,638,734 | 6/1997 | Fish | 83/762 |

*Primary Examiner*—Kenneth E. Peterson
*Attorney, Agent, or Firm*—Sperry, Zoda & Kane

[57] ABSTRACT

An apparatus and method is disclosed for cutting a pocket in the upwardly facing surface of a conventional bagel while allowing a rim of the base material of the bagel to remain extending upwardly therearound to define the cup-shaped open-topped pocket. This pocket is then adapted to receive a filling therein which can be of any type of edible food stock such as eggs, egg salad, tuna salad, vegetables, meat, etc. The apparatus for forming the pocket includes a housing with a floor with a pedestal defining a platform in which the bagel sits. A plate is pivoted into contact with the bagel and compresses the bagel. A cutting aperture is defined in the plate to provide a template for cutting of the pocket out of the central portion of the upwardly facing surface of the bagel. A cutting then extends through the template or cutting aperture for forming the open-topped cup-shaped pocket. The pivotal plate can be translucent to facilitate viewing of the bagel during cutting and can include a handle and is preferably flexibly resilient to exert downward pressure as equally as possible on different points of the bagel itself. A device is included for controlling the depth of cutting of the pocket.

14 Claims, 5 Drawing Sheets

APPARATUS AND METHOD FOR SAFELY FORMING AN OPEN-TOPPED POCKET WITH A PERIPHERALLY ENCLOSING RIM EXTENDING THEREAROUND IN THE UPWARDLY FACING SURFACE OF A BAGEL AND FOOD PRODUCT THEREOF

BACKGROUND OF THE INVENTION

1. Field of the Invention

The present invention deals with the field of the food service industry. In particular, the present invention provides an apparatus which would most likely be used in a commercial establishment for forming a uniquely configured food product from a bagel in a safe manner. Cutting of a bagel is a dangerous activity especially when performed on a regular basis. The present invention provides a means for virtually eliminating any chance of user injury because the bagel is not touched by a human hand during the cutting of the open-topped pocket therein. With the apparatus of the present invention many, many bagels can have these open-topped pockets formed therein per hour which is especially useful for commercial applications.

Many devices have been designed for cutting bagels. However, the present device provides a unique configuration for a bagel wherein an open-topped pocket is formed with a peripherally enclosing rim of original bagel material resulting from the portion of the bagel remaining after cutting of the open-topped pocket in the central portion of the upwardly facing surface of the bagel to a limited depth therein. The bagel can be cut in half prior to cutting of the open-topped configuration so that the pocket can be cut in the upper surface of a complete bagel or in the cut surface of a bagel that has been cut in half. This cutting is achieved by compressing the bagel downwardly between a pivotal plate and a pedestal and cutting the bagel in this partially compressed position thereby greatly facilitating accuracy in the cutting and virtually eliminating any possibility of injury to the user.

2. Description of the Prior Art

Numerous prior art devices have been designed for the handling of bagels particularly for cutting and forming foodstuff therewith such as U.S. Pat. No. 4,343,603 patented Aug. 10, 1982 to R. Pavlow et al and assigned to Roger Pavlow on a "Machine For Encapsulating Food In Dough"; and U.S. Pat. No. 4,674,404 patented Jun. 23, 1987 to L. D'Erasmo on a "Bagel Press"; and U.S. Pat. No. 4,702,926 patented Oct. 27, 1987 to D. Fowler and assigned to Frito-Lay, Inc. on a "Process For Producing Two-Component Dough Products"; and U.S. Pat. No. 4,979,419 patented Dec. 25, 1990 to R. Sonkin on an "Apparatus And Method For Treating Baked Goods"; and U.S. Pat. No. 5,033,193 patented Jul. 23, 1991 to R. Valenti on a "Bagel Scooper"; and U.S. Pat. No. 5,236,724 patented Aug. 17, 1993 to A. Burger on a "Filled Bagel Dough Product And Method"; and U.S. Pat. No. 5,514,395 patented May 7, 1996 to A. Burger on a "Filled Burger Dough Product And Method"; and U.S. Pat. No. 5,557,998 patented Sep. 24, 1996 to E. Schwartz et al on a "Bagel Coring Apparatus"; and U.S. Pat. No. 5,611,266 patented Mar. 18, 1997 to M. Kensrue and assigned to Bagel Trap, Inc. on a "Tool For Cutting Bread And Bagels"; and U.S. Pat. No. 5,638,734 patented Jun. 17, 1997 to R. Fish on a "Bagel And Bun Slicer Apparatus And Method Of Use.

SUMMARY OF THE INVENTION

The present invention provides an apparatus for in a safe manner forming an open-topped pocket with a peripherally enclosing rim extending therearound in the upwardly facing surface of the bagel. The apparatus includes a housing which has a floor means extending therein. A pedestal is mounted on the floor within the housing and extends upwardly therefrom in order to define an elevated bagel retaining platform positioned upwardly remote from the floor.

A pivotal plate is secured such as to pivotally movable with respect to a hinge which in turn is connected to the housing. As such, the pivotal plate is movable an upper positioned extending upwardly from the housing and spatially disposed from the pedestal to facilitate positioning of the bagel upon the elevated bagel receiving platform. The pivotal plate is also movable pivotally to a lower position immediately adjacent and above the elevated bagel retaining platform of the pedestal in order to facilitate retaining of the bagel in position thereupon.

The pivotal plate further defines a lower abutment surface positioned immediately above the elevated bagel retaining platform whenever the pivotal platform is positioned in the lower position. It defines a bagel receiving space in cooperation with the elevated bagel retaining platform to facilitate retaining and selectively allowing the compressing of a bagel located therein. The lower abutment surface of the pivotal plate also defines a cutting aperture therein which is generally circular in shape and smaller than the bagel located therebelow. The cutting aperture provides access to cutting a bagel retained within the bagel receiving space.

The pivotal plate is also adapted to exert a downwardly directed bias upon a bagel within the bagel receiving space in order for compressing of the bagel laterally outwardly outside of the dimensions of the cutting aperture. The pivotal plate is also at least partially transparent in the area adjacent the lower abutment surface thereof in order to facilitate the viewing of a bagel during placement and compression and retaining thereof within the bagel receiving space in order to facilitate accurate positioning and cutting thereof. The lower abutment surface further includes a bagel gripping roughened area thereon to facilitate holding of a bagel securely within the bagel receiving space. The pivotal plate also is flexibly resilient in order to enhance equalizing of the downwardly directed pressure for exertion thereof more evenly throughout a bagel positioned upon the elevated bagel retaining platform during movement of the pivotal plate to the lower position.

A cutting device is also preferably included positioned above the housing and is selectively operable to move downwardly to the cutting position with the pivotal plate in the lower position in order to extend through the cutting aperture into engagement with a bagel located in the bagel receiving space for cutting thereof. This cutting will define a peripherally enclosed open-topped pocket in the upwardly facing surface thereof with a peripheral rim extending therearound to facilitate placement and holding of dissimilar foodstuffs within the pocket for human consumption.

The construction of the cutting means preferably includes a circularly rotatable cutting blade to facilitate the extending thereof through the circular cutting aperture or template to aid in cutting of the generally round open-topped pocket in the upwardly facing surface of the bagel which is surrounded by a peripheral enclosure or rim. Also the cutting device preferably includes a depth control device which limits the depth of penetration of the cutting blade through the cutting aperture template to facilitate control and accuracy in the depth of cutting of the pocket within the upwardly facing surface of the bagel retained therebelow.

Preferably the device of the present invention further includes a handle fixedly secured to the pivotal plate and spatially disposed from the location of pivotal securement thereof with respect to the housing. In this manner the handle will aid in movement of the pivotal plate between the respective lower and upper positions thereof and will facilitate exertion of a downward bias for compressing of a bagel positioned within the bagel receiving space during cutting thereof. Furthermore the device of the present invention preferably includes a hinge secured to the housing and to the pivotal plate means to facilitate the relative pivotal movement therebetween.

In operating the apparatus of the present invention the initial step in the process is the placement of the bagel upon the pedestal. The placed bagel can be complete, that is whole, or can be pre-cut in half such that the open-topped pocket can be formed in the upper surface of the bagel or in the upwardly facing portion of a half bagel, that is, a pre-cut bagel. Thereafter a movable plate member will be located above the bagel and the pedestal with a cutting aperture defined therein smaller in diameter than the bagel. The plate member will then be moved downwardly into abutment with the bagel therebelow with the cutting aperture centered on the upwardly facing surface of the bagel from above.

The plate member will then be urged downwardly to compress the bagel such that at least a portion thereof extends laterally below and outwardly outside of the cutting aperture. The cutting means will then be positioned within the cutting aperture and will be moved downwardly through the cutting aperture to engage the upwardly facing surface of the bagel to cut a pocket therein while allowing a rim of bagel material to remain peripherally enclosing therearound. Finally the bagel with the open-topped pocket formed and the peripherally enclosing rim will be removed from atop the pedestal.

It is an object of the present invention to provide a method and apparatus for safely forming an open-topped pocket with a peripherally enclosing rim extending therearound in the upwardly facing surface of a bagel and product formed thereby which can be safely and repetitively used while minimizing the possibility of damage to the equipment operator.

It is an object of the present invention to provide a method and apparatus for safely forming an open-topped pocket with a peripherally enclosing rim extending therearound in the upwardly facing surface of a bagel and product formed thereby which is easy and convenient to use.

It is an object of the present invention to provide a method and apparatus for safely forming an open-topped pocket with a peripherally enclosing rim extending therearound in the upwardly facing surface of a bagel and product formed thereby which can form the desired pocket in the upwardly facing surface of a bagel quickly and accurately.

It is an object of the present invention to provide a method and apparatus for safely forming an open-topped pocket with a peripherally enclosing rim extending therearound in the upwardly facing surface of a bagel and product formed thereby which has a minimum number of moving parts.

It is an object of the present invention to provide a method and apparatus for safely forming an open-topped pocket with a peripherally enclosing rim extending therearound in the upwardly facing surface of a bagel and product formed thereby which can be easily cleaned at conventional food handling cleaning operations.

It is an object of the present invention to provide a method and apparatus for safely forming an open-topped pocket with a peripherally enclosing rim extending therearound in the upwardly facing surface of a bagel and product formed thereby which can be easily disassembled for maintenance.

It is an object of the present invention to provide a method and apparatus for safely forming an open-topped pocket with a peripherally enclosing rim extending therearound in the upwardly facing surface of a bagel and product formed thereby which can carefully and accurately cut bagels repeatedly within very narrow operating tolerances.

It is an object of the present invention to provide a method and apparatus for safely forming an open-topped pocket with a peripherally enclosing rim extending therearound in the upwardly facing surface of a bagel and product formed thereby which performs the actual cutting operation during a time when the bagel is not touched by the hands of the equipment operator.

It is an object of the present invention to provide a method and apparatus for safely forming an open-topped pocket with a peripherally enclosing rim extending therearound in the upwardly facing surface of a bagel and product formed thereby which can be easily monitored due to the preferably clear material of which the pivotal plate is made.

It is an object of the present invention to provide a method and apparatus for safely forming an open-topped pocket with a peripherally enclosing rim extending therearound in the upwardly facing surface of a bagel wherein the bagel can comprising a complete un cut bagel or a bagel cut in half with either side being the upwardly facing surface.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a means for providing a unique configuration from a cooked bagel 10 which facilitates eating of a bagel with various dissimilar food substances such as chili, tuna, cheese, vegetables or any other foodstuff that can be retained within an open-topped pocket 14.

The apparatus of the present invention includes a housing 20 which preferably includes a floor area 22 upon which a pedestal 24 is mounted. Pedestal 24 preferably defines an elevated bagel receiving platform 26 extending upwardly from the floor 22. A pivotal plate 28 is pivotally mounted with respect to the housing 20 preferably by way of a hinge 54 which is fixedly secured to the housing 20 on one hinge portion thereof and to the pivotal plate 28 on the opposite hinged portion thereof. In this manner hinge 54 facilitates the pivotal movement of pivotal plate 28 with respect to the housing 20.

Figure 1:
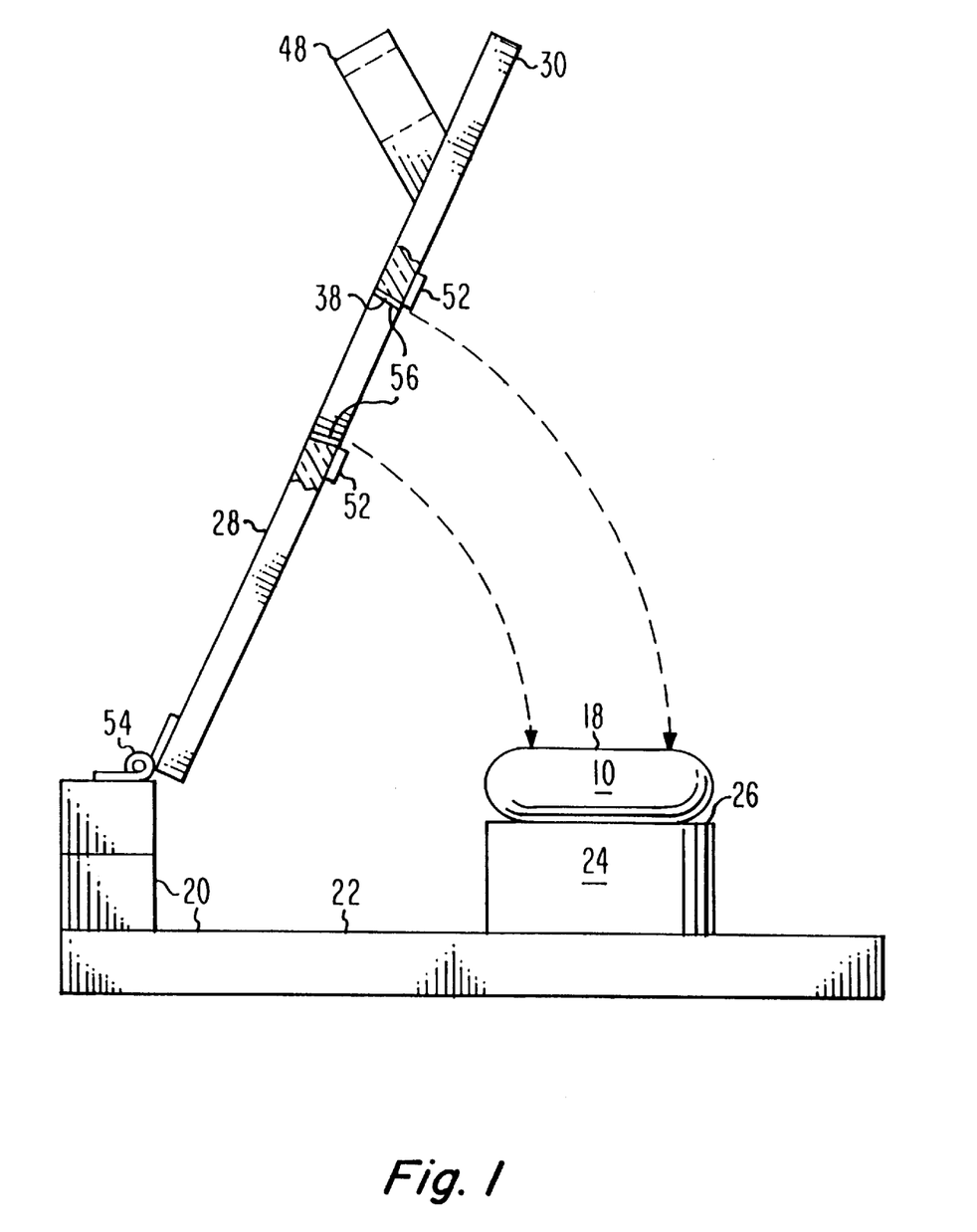
FIG. 1 is a front plan view of an embodiment of the apparatus of the present invention showing the pivotal plate in the upper position.
Figure 2:
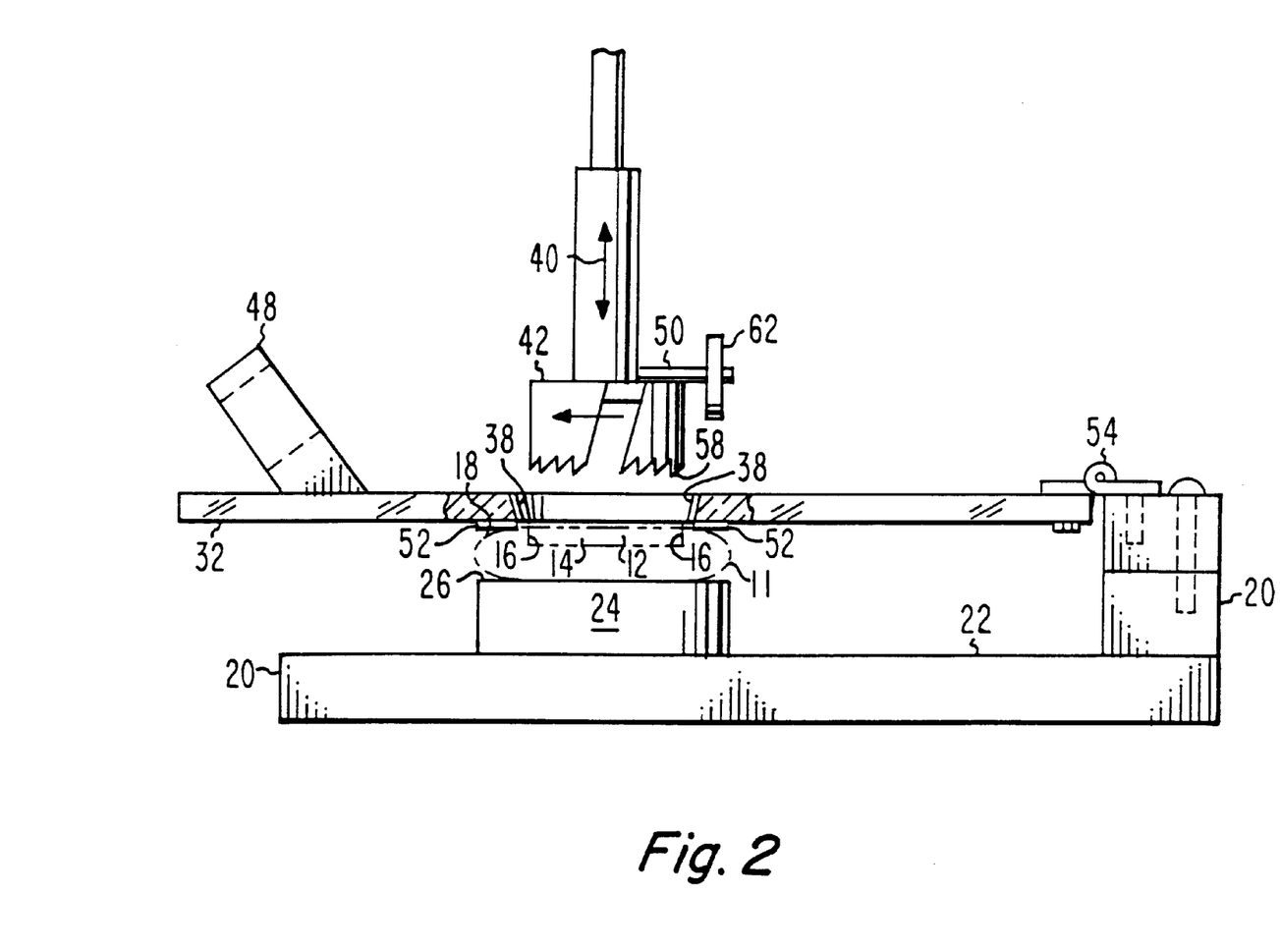
FIG. 2 is a rear plan view of the embodiment shown in FIG. 1 with the pivotal plate shown in the lower position after cutting.
Figures 3, 4:
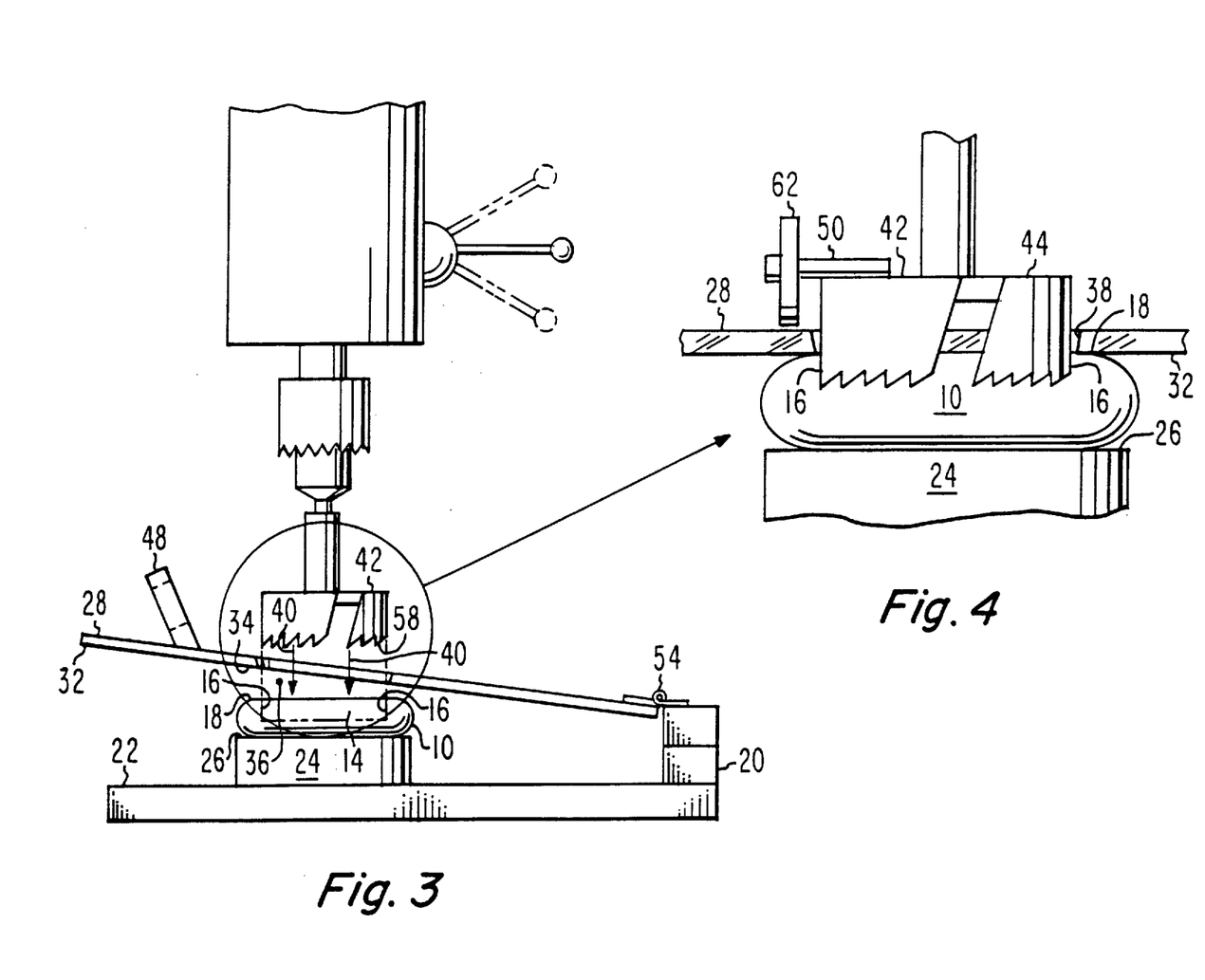
FIG. 3 is another rear plan view of the embodiment shown in FIG. 1 showing movement of the cutting means out of engagement with the bagel.
FIG. 4 is an enlarged view of the apparatus of the present invention showing the maximum extent of downward penetration by the cutting means into the bagel restricted by the depth limiting device.
Figure 5:
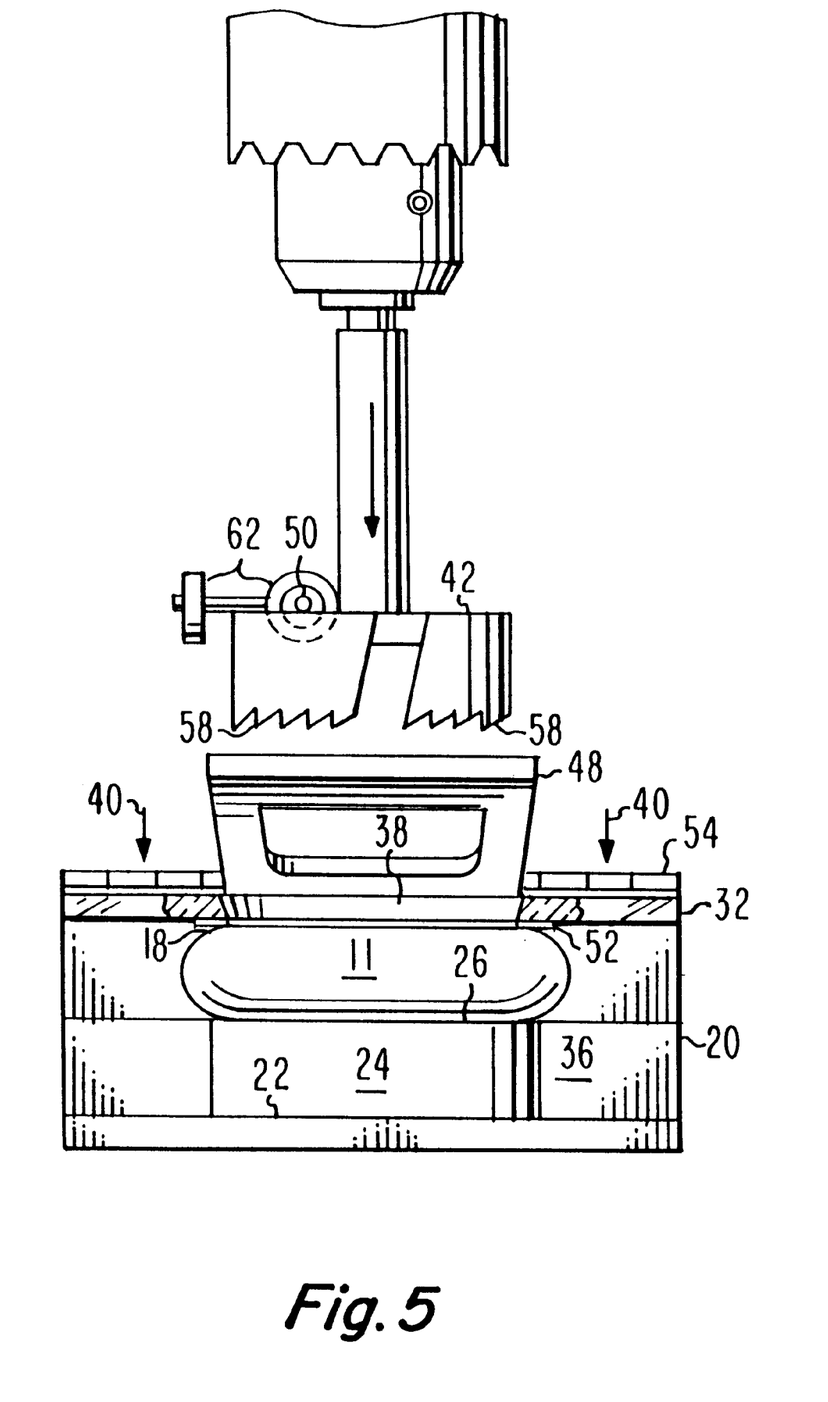
FIG. 5 is an illustration of the embodiment shown in FIG. 1 with the pivotal plate in the lower position and the cutting means moving downwardly toward the cutting template aperture.
Figure 6:
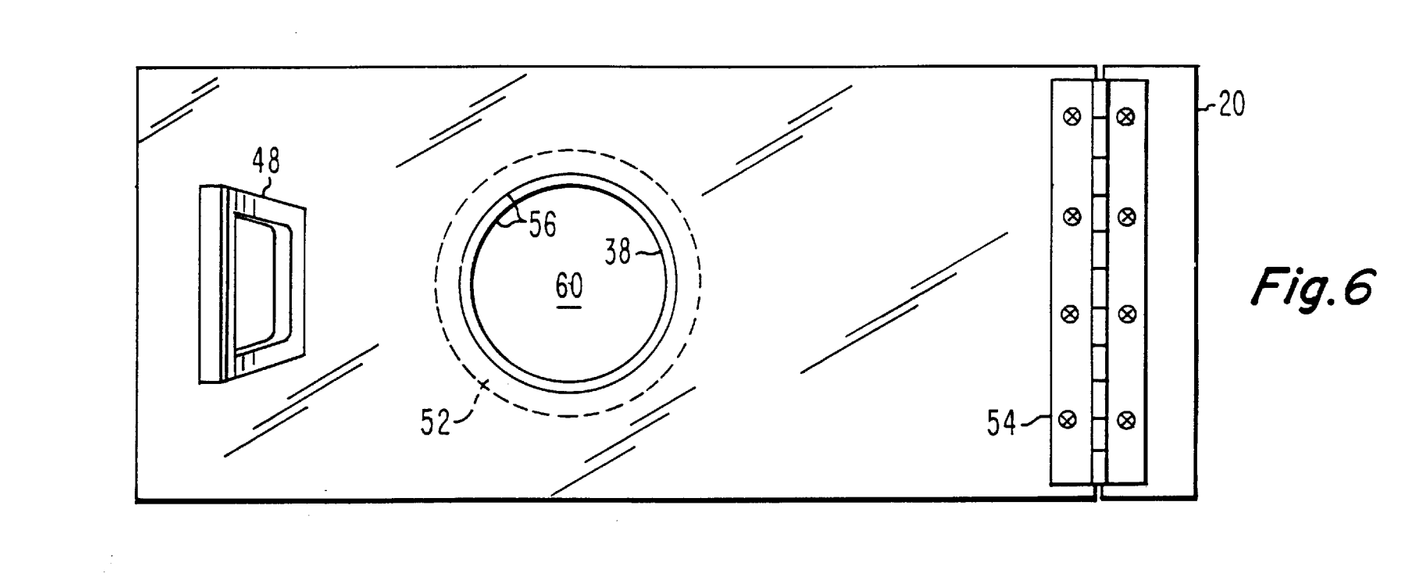
FIG. 6 is a top plan view of an embodiment of the housing and pivotal plate of the present invention.
Figure 7:
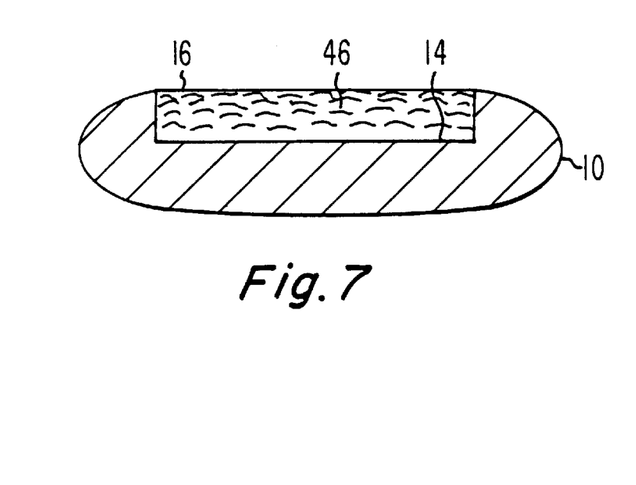
FIG. 7 is a cross-sectional view of an embodiment of the food product produced in accordance with the present invention.
Figure 8:
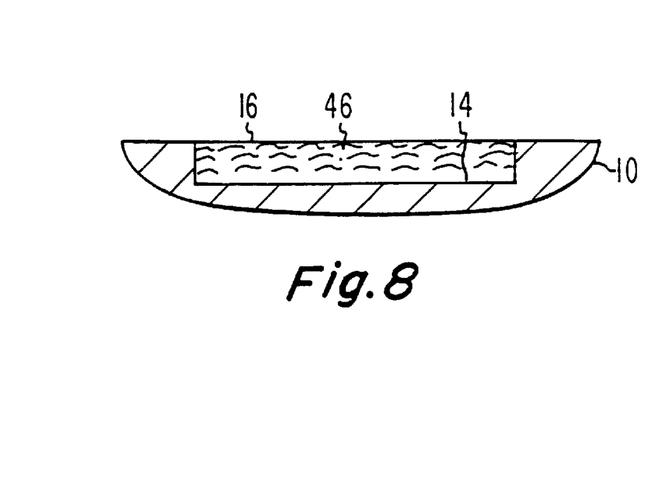
FIG. 8 is a cross-sectional view of an alternative embodiment of the food product produced in accordance with the present invention.

Pivotal plate 28 is preferably movable between an upper position 30 as shown best in FIG. 1 and a lower position 32 as shown in FIGS. 2, 4 and 5.

When moved to the lower position 32 the pivotal plate 28 is adapted to move into abutment with a the upwardly facing surface of a bagel 10 placed upon the elevated bagel retaining platform 26 of pedestal 24 to facilitating holding and also perhaps compressing thereof during cutting of the pocket 14 such that it has an open top 12. The bagel 10 so placed can comprising a complete bagel or a half bagel that has been pre-cut with either the cut surface of the non-cut surface facing upwardly.

The area of the undersurface of the pivotal plate 28 which is adapted to contact the bagel 10 is defined as the lower abutment surface 34. This lower abutment surface 34 preferably includes a cutting aperture 38 defined therein. Preferably cutting aperture 38 is of a circular shape and is smaller than the bagel such that when cutting occurs a rim 16 of the original bagel material will remain peripherally surrounding and enclosing the open-topped pocket 14.

When the pivotal plate 28 is in the lower position 32 the lower abutment surface 34 in cooperation with the elevated bagel retaining platform 26 will define therebetween a bagel receiving space 36. A bagel retained in this space will be adapted to be compressed between the pedestal 24 and the lower abutment surface 34 in such a manner that portions of the bagel will extend laterally outwardly beyond the lateral dimension of the cutting aperture or template 38. This downward force for compression is shown by the downward force arrow 40.

When the bagel is in this compressed position 11 a cutting means 42 will be adapted to move downwardly into the cutting aperture or template 38 which is immediately adjacent the upwardly facing surface 18 of the bagel 10. In this manner the cutting means is in the cutting position 44. The cutting means 42 will then extend downwardly and come into abutment with the upwardly facing surface 18 of the compressed bagel 11 to thereby cut a cup-shaped open-topped pocket 14 therein while allowing a peripheral rim of the original material of the bagel to remain such that this rim 16 actually defines the lateral outer boundaries of the pocket 14. In this manner dissimilar foodstuffs 46 can be received within the pocket 14 and will easily be retained therein. Such dissimilar foodstuffs might include egg salad, egg omelet material such as for conventional breakfast foods, or could be of any type of material including luncheon materials such as tuna salad, vegetables, meats, chili, etc.

To facilitate the exertion of downward bias along force arrows 40 by the pivotal plate 28, it is preferable to include in the configuration a handle 48 of some shape or form attached fixedly to the pivotal plate 28. This handle preferably is positioned at the opposite end of the pivotal plate 28 from the pivotal connection thereof to the housing 20. That is, normally at the opposite end from hinge 54. With this configuration the user can press downwardly in an equalized manner along all portions of the bagel 10 to facilitate retaining thereof and compressing equally therealong to aid in forming of the pocket 14. In the most preferred configuration, the pivotal plate 28 is flexibly resilient such as to be capable of bending slightly as shown in FIG. 2 when downward pressure is exerted thereon to aid in most firmly retaining the compressed bagel 10 in position within the bagel receiving space 36. Also to aid in retaining the bagel in the bagel receiving space 36, preferably at least a portion of the lower abutment surface 34 will include a bagel gripping means 52 thereon which may include a roughened surface or other particular surface or members designed particularly for facilitating retaining of the bagel in fixed position during cutting thereof. Although a roughened surface is shown in the drawings of the invention, other means for retaining the bagel could be included such as an irregular surface or any other conventional means for increasing the friction of the pivotal plate 20 in the area of the lower abutment surface 34 thereof.

To further facilitate the cutting operation wherein the cutting aperture means 38 acts as a template for cutting preferably this aperture includes a taper 56 therein. Such taper would be slightly larger on the upwardly facing surface thereof and slightly smaller on the lower surface thereof to aid in the guiding of the cutting means 42 into engagement with the upwardly facing surface 18 of a compressed bagel 11. It should be appreciated that this taper is only optional and is not a required element of the present invention. It also should be appreciated that the inclusion of the bagel gripping surface 52 such as a roughened surface or the like is also only an option and is not a required element of the present invention.

In a preferred but not required configuration of the present invention the cutting means 42 includes a circular cutting blade 58 and the cutting aperture 38 comprises a circular cutting template 60. With this configuration the outer periphery of the open-topped pocket 14 will be defined in a circular manner. With this configuration and with any configuration for cutting depth control for cutting of the pocket is important. For this reason the present invention includes a depth control means 50 which may include rollers 62 which control the depth of penetration of the cutting means 42 downwardly beyond the upwardly facing surface 18 of the bagel 10. These rollers may be changed such that different sized rollers can replace previous rollers in order to increase or decrease the depth of the pocket 14 within the bagel 10 as desired by the user.

In operation of the apparatus of the present invention, initially a bagel 10 is placed upon the elevated bagel retaining platform 26 of the pedestal 24. Then the pivotal plate member 28 is moved downwardly into abutment with the bagel therebelow for compressing thereof by the lower abutment surface 34 with the cutting aperture 38 centered on the upwardly facing surface 18 of the compressed bagel 11 from above. Thereafter the pivotal plate member 28 is forcibly moved downwardly preferably by gripping of the handle 48 and urging it downwardly in such a manner as to compress the bagel such that at least part of the bagel extends laterally below and outwardly outside of the cutting aperture 38 such that when cutting occurs using the cutting aperture as a template 60 a peripheral rim 16 of the bagel material will remain to define the pocket 14.

Thereafter the cutting means 42 is positioned within the cutting aperture and is moved downwardly to engage the upwardly facing surface 18 of the compressed bagel 11 in such a manner as to cut the open-topped pocket 14 therein and allow a peripheral rim 16 to remain peripherally enclosing the open-topped pocket 14. Thereafter the pivotal plate member 28 is moved upwardly to allow the bagel 10 to be removed from the pedestal 24. Thereafter the peripherally enclosed open-topped pocket can receive dissimilar foodstuff placed therein such as chili, egg salad, tuna salad, vegetables, meats or other materials to form an easily edible and convenient sandwich configuration which can be easily controlled and lifted with one hand. In the operation of this invention it should be appreciated that the bagel can be cut in half prior to positioning on the pedestal for cutting of the open-topped configuration, As such, the open-topped pocket can be cut in the upper surface of a complete bagel or in the cut surface of a bagel that has been cut in half or in the upwardly facing non-cut surface or a cut bagel. Each of these configurations of the bagel prior to cutting of the pocket therein are to be included as contemplated within this invention and have been described generically herein as the upwardly facing bagel surface.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for safely cutting an upwardly facing surface of a bagel to form an open-topped pocket therein with a peripherally enclosing rim extending therearound which comprises:

A. a housing means including a floor means defined therewithin;

B. a pedestal means mounted on said floor means within said housing means and extending upwardly therefrom to define an elevated bagel retaining platform spatially disposed upwardly from said floor means;

C. a pivotal plate means secured pivotally with respect to said housing means and being movable between an upper position extending upwardly from said housing means and spatially disposed from said pedestal means to facilitate positioning of a bagel upon said elevated bagel retaining platform and a lower position immediately adjacent and above said elevated bagel retaining platform of said pedestal means to facilitate retaining of a bagel in position thereupon, said pivotal plate means in the lower position further defining a lower abutment surface positioned immediately above said elevated bagel retaining platform and defining therebetween a bagel receiving space to facilitate retaining and to selectively allow compressing of a bagel therewithin, said lower abutment surface of said pivotal plate means defining a cutting aperture means therein providing access to cutting a bagel retained within said bagel receiving space, said lower abutment surface further including a bagel gripping means thereon to facilitate holding of a bagel securely within said bagel receiving space, said pivotal plate means being adapted to exert downwardly directed bias upon a bagel within said bagel receiving space for compressing thereof laterally outwardly outside of said cutting aperture means; and D. a cutting means positioned above said housing means and selectively operative to move downwardly to a cutting position with said pivotal plate means in the lower position to extend through said cutting aperture means into engagement with a bagel held within said bagel receiving space for cutting thereof to define a peripherally enclosed open-topped pocket in the upwardly facing surface thereof with a peripheral rim extending therearound to facilitate placement and holding of dissimilar foodstuffs therein for human consumption.

2. An apparatus for safely cutting an upwardly facing surface of a bagel to form an open-topped pocket therein with a peripherally enclosing rim extending therearound as defined in claim 1 wherein said pivotal plate means is at least partially transparent adjacent said lower abutment surface to facilitate viewing of a bagel during placing and retaining thereof within said bagel receiving space to facilitate accurate positioning and cutting thereof.

3. An apparatus for safely cutting an upwardly facing surface of a bagel to form an open-topped pocket therein with a peripherally enclosing rim extending therearound as defined in claim 1 further comprising a handle means fixedly secured to said pivotal plate means spatially disposed from the location of pivotal securement thereof with respect to said housing means to facilitate movement of said pivotal plate means between the respective lower and upper positions thereof and to facilitate exertion of downward bias on a bagel positioned within said bagel receiving space during cutting thereof.

4. An apparatus for safely cutting an upwardly facing surface of a bagel to form an open-topped pocket therein with a peripherally enclosing rim extending therearound as defined in claim 1 wherein said cutting aperture means is circular in shape.

5. An apparatus for safely cutting an upwardly facing surface of a bagel to form an open-topped pocket therein with a peripherally enclosing rim extending therearound as defined in claim 4 wherein said cutting means includes a circularly movable cutting blade to facilitate extending through said circular cutting aperture means to facilitate cutting of a generally round open-topped pocket in the upwardly facing surface of a bagel which is surrounded with a peripheral enclosure.

6. An apparatus for safely cutting an upwardly facing surface of a bagel to form an open-topped pocket therein with a peripherally enclosing rim extending therearound as defined in claim 1 wherein said pivotal plate means is flexibly resilient to enhance equalizing of downwardly directed pressure for exertion thereof more evenly throughout a bagel positioned upon said elevated bagel retaining platform during movement of said pivotal plate means to the lower position.

7. An apparatus for safely cutting an upwardly facing surface of a bagel to form an open-topped pocket therein with a peripherally enclosing rim extending therearound as defined in claim 1 wherein said cutting means includes a depth control means for limiting the depth of penetration of said cutting means through said cutting aperture means to facilitate control in the depth of cutting of the pocket in a bagel retained therebelow.

8. An apparatus for safely cutting an upwardly facing surface of a bagel to form an open-topped pocket therein with a peripherally enclosing rim extending therearound as defined in claim 1 wherein said cutting means includes a circular cutting blade and wherein said cutting aperture means is circular to define a circular cutting template for guiding said circular cutting blade to extend therethrough into abutment with a bagel therebelow for cutting a peripherally enclosed open-topped pocket in the upwardly facing surface thereof with a peripheral rim extending therearound.

9. An apparatus for safely cutting an upwardly facing surface of a bagel to form an open-topped pocket therein with a peripherally enclosing rim extending therearound as defined in claim 1 wherein said bagel gripping means comprises a roughened surface across at least a portion of said lower abutment surface to facilitate retaining of a bagel thereadjacent.

10. An apparatus for safely cutting an upwardly facing surface of a bagel to form an open-topped pocket therein with a peripherally enclosing rim extending therearound as defined in claim 1 further comprising a hinge means secured to said housing means and to said pivotal plate means to allow relative pivotal movement therebetween.

11. An apparatus for safely cutting an upwardly facing surface of a bagel to form an open-topped pocket therein with a peripherally enclosing rim extending therearound as defined in claim 1 wherein said cutting aperture means is tapered to facilitate guiding of said cutting means therethrough to contact a bagel retained therebelow.

12. An apparatus for safely cutting an upwardly facing surface of a bagel to form an open-topped pocket therein with a peripherally enclosing rim extending therearound as defined in claim 11 wherein said cutting aperture means is tapered with the smaller end thereof adjacent said lower abutment surface to facilitate retaining and cutting of a bagel held within said bagel receiving space.

13. An apparatus for safely cutting an upwardly facing surface of a bagel to form an open-topped pocket therein with a peripherally enclosing rim extending therearound as defined in claim 1 wherein said pedestal means extends upwardly from said floor means of said housing for a sufficient distance to allow the hand of a user to hold a bagel on said elevated bagel retaining platform as said pivotal plate means is moved toward the lower position thereof for retaining a bagel in said bagel receiving space prior to contact thereof with said lower abutment surface of said pivotal plate means.

14. An apparatus for safely cutting an upwardly facing surface of a bagel to form an open-topped pocket therein with a peripherally enclosing rim extending therearound which comprises:

A. a housing means including a floor means defined therewithin;

B. a pedestal means mounted on said floor means within said housing means and extending upwardly therefrom to define an elevated bagel retaining platform spatially disposed upwardly from said floor means;

C. a pivotal plate means secured pivotally with respect to said housing means and being movable between an upper position extending upwardly from said housing means and spatially disposed from said pedestal means to facilitate positioning of a bagel upon said elevated bagel retaining platform and a lower position immediately adjacent and above said elevated bagel retaining platform of said pedestal means to facilitate retaining of a bagel in position thereupon, said pivotal plate means further defining a lower abutment surface positioned immediately above said elevated bagel retaining platform whenever said pivotal plate means is positioned in the lower position, said lower abutment surface and said elevated bagel retaining platform defining therebetween a bagel receiving space to facilitate retaining and to selectively allow compressing of a bagel therewithin, said lower abutment surface of said pivotal plate means defining a cutting aperture means therein generally circular in shape, said cutting aperture means providing access to cutting a bagel retained within said bagel receiving space, said pivotal plate means being adapted to exert downwardly directed bias upon a bagel within said bagel receiving space for compressing thereof laterally outwardly outside of said cutting aperture means, said pivotal plate means being at least partially transparent adjacent said lower abutment surface to facilitate viewing of a bagel during placing and retaining thereof within said bagel receiving space to facilitate accurate positioning and cutting thereof, said lower abutment surface including a bagel gripping roughened means thereon to facilitate holding of a bagel securely within said bagel receiving space, said pivotal plate means being flexibly resilient to enhance equalizing of downwardly directed pressure for exertion thereof more evenly throughout a bagel positioned upon said elevated bagel retaining platform during movement of said pivotal plate means to the lower position;

D. a cutting means positioned above said housing means and selectively operative to move downwardly to a cutting position with said pivotal plate means in the lower position to extend through said cutting aperture means into engagement with a bagel held within said bagel receiving space for cutting thereof to define a peripherally enclosed open-topped pocket in the upwardly facing surface thereof with a peripheral rim extending therearound to facilitate placement and holding of dissimilar foodstuffs therein for human consumption, said cutting means including:

(1) a circularly rotatable cutting blade to facilitate extending through said circular cutting aperture means to facilitate cutting of a peripherally enclosed open-topped pocket in the upwardly facing surface thereof with a peripheral rim extending therearound;

(2) a depth control means for limiting the depth of penetration of said cutting blade through said cutting aperture means to facilitate control in the depth of cutting of the pocket in a bagel retained therebelow;

E. a handle means fixedly secured to said pivotal plate means spatially disposed from the location of pivotal securement thereof with respect to said housing means to facilitate movement of said pivotal plate means between the respective lower and upper positions thereof and to facilitate exertion of downward bias on a bagel positioned within said bagel receiving space during cutting thereof; and F. a hinge means secured to said housing means and to said pivotal plate means to facilitate relative pivotal movement therebetween.

* * * * *

UNITED STATES PATENT AND TRADEMARK OFFICE
CERTIFICATE OF CORRECTION

PATENT NO. : 5,944,459
DATED : August 31, 1999
INVENTOR(S) : William H. Gill

It is certified that error appears in the above-identified patent and that said Letters Patent are hereby corrected as shown below:

Title page, insert before item [21] item [73]

Assignees: William H. Gill of Lambertville, NJ; and
Janet G. Corbin of Trenton, NJ Signed and Sealed this Twenty-ninth Day of August, 2000

Attest:

Q. TODD DICKINSON

Attesting Officer

Director of Patents and Trademarks